Oct. 24, 1950     C. H. HARTLEY     2,526,818
SAFETY PIN
Filed May 21, 1946
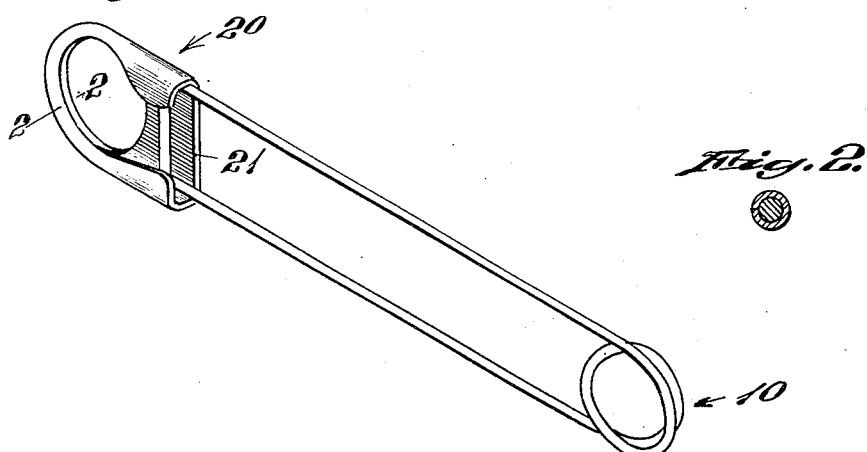
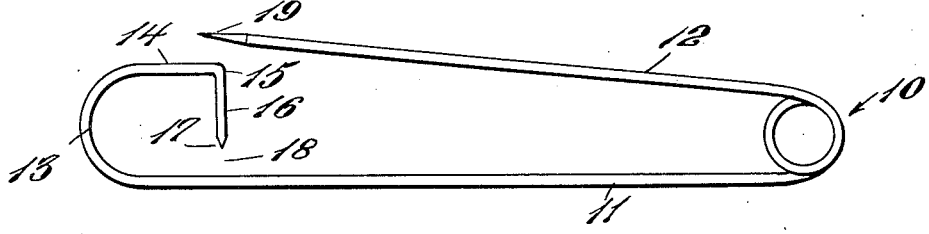
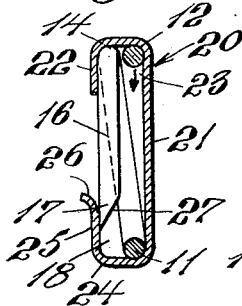
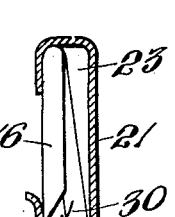
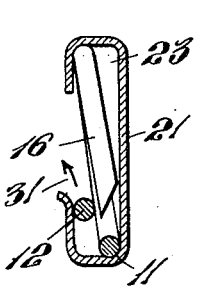
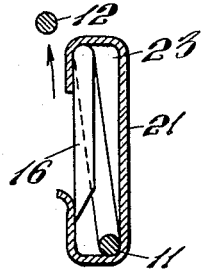
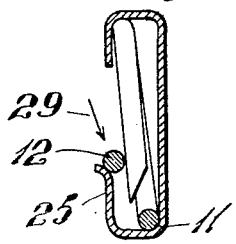
INVENTOR.
Charles H. Hartley
BY
Barlow & Barlow
ATTORNEYS.

Patented Oct. 24, 1950

2,526,818

UNITED STATES PATENT OFFICE 2,526,818

SAFETY PIN

Charles H. Hartley, Wickford, R. I.

Application May 21, 1946, Serial No. 671,322

4 Claims. (Cl. 24—156)

This invention relates to a safety pin.

Safety pins frequently come unclasped due to pressure being exerted upon the member which has the pointed end and this is a source of annoyance when the same is in use, particularly when used upon children or babies, where there is a danger of the baby in bed rolling upon a pin after it has become unclasped, with the result that the point of the pin will stick into the child. This fault is particularly noticed where diapers are used on babies and safety pins are used for securing the same.

One of the objects of this invention is to provide a safety pin which cannot become unclasped due to usual pressure upon the pointed member of the pin which is ordinarily used for detaching this pointed member from its clasp.

Another object of this invention is to provide a safety pin which may be of such construction that it may be readily manufactured by machine operations.

Another object of this invention is to provide a safety pin which, although the same will not accidentally become unclasped, may be readily unclasped by the use of two hands for detaching the pin stem from its clasp.

Another object of this invention is the provision of a safety pin which may be clasped by one hand.

With these and other objects in view, the invention consists of certain novel features of construction, as will be more fully described and particularly pointed out in the appended claims.

In the accompanying drawings:

Fig. 1 is a perspective view of the safety pin in clasped position;

Fig. 2 is a section on line 2—2 of Fig. 1;

Fig. 3 is an elevation showing the wire portion of the safety pin prior to the assembly of the guard thereon;

Figs. 4, 5, 6, 7 and 8 are sectional views through the guard and showing the parts of the safety pin in different relative positions which these parts may assume in the operation of the safety pin.

In proceeding with this invention, I bend up from a piece of wire a pin portion having a relatively stationary member and a relatively movable member by means of coiling the wire intermediate its ends so that these two portions may extend from this coil. This coil provides a spring action against which the movable member operates. The stationary member which has the guard assembled therewith is provided with a tongue which so cooperates with the guard that the movable member when in the guard and between this tongue and the guard cannot become loose without an additional hand being utilized for moving the tongue to permit the movable member to be released. Thus this movable member may be flexed back and forth in the guard due to pressure applied to the movable member without the danger of its becoming unclasped.

With reference to the drawings, the wire portion of the safety pin is coiled a little more than 1½ times at 10 to provide a relatively stationary member 11 and a relatively movable member 12 extending from this coil. This coil also provides for resilient action of the two members 11 and 12 although these members also have inherent resiliency for elastic bending themselves.

The stationary member 11 is bent in an arc as at 13 to extend back upon itself in the portion 14 for a short distance which is parallel to the member 11 and thence this portion is bent as at 15 to extend laterally as at 16 toward the member 11 to provide a tongue the end 17 of which is spaced as at 18 from this member 11. The member 12 is of a length to extend beyond the tongue 16 and is pointed as at 19 at its end so that it may readily pierce a piece of fabric to which it is desired the pin should be attached.

A guard designated generally 20 is formed of sheet stock and is bent about the stationary portion at its arc 13 so as to cooperate with the various parts of this end portion. This sheet stock provides a body 21 which extends between the portion 14 and member 11 and is folded about the member 11 and also about the portion 14 of this stationary member, the sheet stock being wrapped tightly about the arc 13 to hold it in place and bent as at 22 about the portion 14 in such a manner as to leave a space 23 between this portion and the sheet stock 21 for the reception of the member 12 (see Fig. 4). The sheet stock is also bent as at 24 to provide a lip 25 which is flared as at 26, this lip being spaced from the body portion 21 as illustrated in the sectional views (see, for instance, Fig. 4). The tongue 16 has its end portion 17 resting against the lip 25, this tongue being sufficiently resilient so that it may be bent inwardly as desired. This lip bridges the gap 18 between the end of the tongue and the member 11 so as to prevent movement of the movable member 12 outwardly from the guard. This tongue is also bevelled as at 27 so as to guide the member 12 toward the body 21 in its movement between the tongue and the body 21.

The member 12 is of a length sufficient to extend beyond the tongue 16 and into the guard as illustrated particularly in Figs. 1 and 3, and in order to insert the member 12 into clasped position within the guard it is merely necessary to position the end portion of the member 12 beneath the flare 26 of the lip and the tongue 16 and then press in a direction as shown by arrow 29 in Fig. 8 so that the tongue will be flexed inwardly, thus permitting the member 12 to enter the guard, and upon releasing pressure upon the member 12 it will then be guided by the bevel 27 along the tongue and between it and the body 21 to the position shown in Fig. 4. Any amount of pressure moving the member 12 back and forth between the tongue and the body of the guard 21 will not serve to permit the escape of the member 12 from clasped position.

If it is desired to unclasp the member 12, the member will be moved from the position shown in Fig. 4 to the position shown in Fig. 5 as shown by the arrow 30, and then the tongue 16 will be pressed inwardly as shown in Fig. 6 and the member 12 may then be moved outwardly as shown by the arrow 31 to the position shown in Fig. 7, where it is free to be inserted into fabric or some material as is desired should be secured by the safety pin.

I claim:

1. A safety pin comprising relatively stationary and movable members, said stationary member being bent to extend back upon itself in spaced relation thereto and thence laterally of the member toward the stationary member to provide a resilient tongue the end of which is spaced therefrom, a guard embracing said bent portion of the stationary member and having a body extending on one side between said spaced stationary member and the portion extending back upon it and provided on the other side with a lip bridging the space between said tongue and member and against which the end portion of said tongue rests, said movable member being of a length to extend beyond said tongue into said guard and insertable between said lip and tongue by flexing of the tongue away from the lip to be locked in position between said tongue and body portion of the guard.

2. A safety pin as set forth in claim 1 wherein said tongue is beveled at its end.

3. A safety pin as set forth in claim 1 wherein said lip is flared outwardly at its free edge.

4. A safety pin as set forth in claim 1 wherein said tongue is beveled at its end on the side away from the lip.

CHARLES H. HARTLEY.

REFERENCES CITED

The following references are of record in the file of this patent:

UNITED STATES PATENTS

| Number | Name | Date |
| --- | --- | --- |
| 380,896 | Jenkins | Apr. 10, 1888 |
| 2,129,191 | Behling et al. | Sept. 6, 1938 |